US009024733B2

(12) United States Patent
Wouters

(10) Patent No.: US 9,024,733 B2
(45) Date of Patent: May 5, 2015

(54) PROGRAMMING OF A UNIVERSAL REMOTE CONTROL DEVICE

(75) Inventor: Johan Agnes Emiel Wouters, Leuven (BE)

(73) Assignee: Koninklijke Philips N.V., Eindhoven (NL)

( * ) Notice: Subject to any disclaimer, the term of this patent is extended or adjusted under 35 U.S.C. 154(b) by 1575 days.

(21) Appl. No.: 12/095,020

(22) PCT Filed: Nov. 27, 2006

(86) PCT No.: PCT/IB2006/054438

§ 371 (c)(1),
(2), (4) Date: May 27, 2008

(87) PCT Pub. No.: WO2007/063471

PCT Pub. Date: Jun. 7, 2007

(65) Prior Publication Data

US 2008/0297372 A1 Dec. 4, 2008

(30) Foreign Application Priority Data

Nov. 30, 2005 (EP) .................................... 05111486

(51) Int. Cl.
*G05B 11/01* (2006.01)
*G08C 19/28* (2006.01)

(52) U.S. Cl.
CPC ............ *G08C 19/28* (2013.01); *G08C 2201/20* (2013.01); *G08C 2201/92* (2013.01)

(58) Field of Classification Search
USPC ........... 340/4.3, 4.31, 4.32, 4.37, 10.5, 12.22, 340/12.23, 12.24, 12.28, 12.53; 341/176; 345/158, 169; 348/14.04, 114, 161, 348/211.99, 569, 734, E7.086, E7.087, 348/E5.042, FOR. 188; 715/738, 740, 744
See application file for complete search history.

(56) References Cited

U.S. PATENT DOCUMENTS

| | | | | | |
|---|---|---|---|---|---|
| 4,623,887 | A * | 11/1986 | Welles, II | .................. | 340/12.24 |
| 4,843,384 | A * | 6/1989 | Ide et al. | ...................... | 340/4.35 |
| 5,517,257 | A * | 5/1996 | Dunn et al. | .................. | 348/734 |
| 5,819,294 | A * | 10/1998 | Chambers | .................. | 340/12.24 |
| 5,852,615 | A * | 12/1998 | Holo et al. | .................... | 714/712 |
| 5,886,753 | A * | 3/1999 | Shinyagaito et al. | ........... | 725/59 |
| 6,008,735 | A * | 12/1999 | Chiloyan et al. | ........... | 340/12.24 |
| D433,675 | S * | 11/2000 | Carranco et al. | ............. | D14/218 |
| 6,157,319 | A * | 12/2000 | Johns et al. | ................ | 340/12.24 |
| 6,211,870 | B1 * | 4/2001 | Foster | ........................... | 715/744 |
| 6,788,241 | B2 * | 9/2004 | Arling et al. | .................. | 341/176 |
| 6,882,299 | B1 * | 4/2005 | Allport | .......................... | 341/176 |
| 6,909,378 | B1 * | 6/2005 | Lambrechts et al. | ........ | 340/4.32 |
| 7,525,473 | B2 * | 4/2009 | Chu et al. | ...................... | 341/176 |

(Continued)

FOREIGN PATENT DOCUMENTS

| | | | | | |
|---|---|---|---|---|---|
| JP | 2004080256 | A * | 3/2004 | ............. | H04N 5/225 |
| JP | 2005513941 | A | 5/2005 | | |

(Continued)

*Primary Examiner* — Paul Obiniyi

(57) ABSTRACT

A universal remote control device (10) is programmed by determining layout properties of an existing remote control device (12) that must be replaced by the universal remote control device (10). Information identifying at least part of said layout properties is input into a selection system (14, 18). A command set for the universal remote control device (10) is selected dependent on said information. The universal remote control device (10) is programmed to implement the selected command set.

22 Claims, 2 Drawing Sheets

(56) References Cited

U.S. PATENT DOCUMENTS

Figure 1:
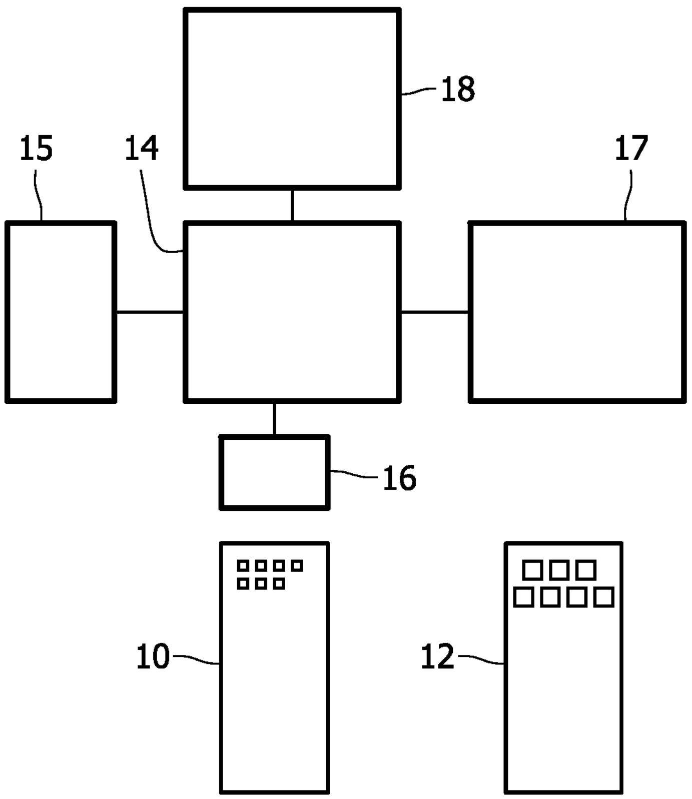

| | | | | |
|---|---|---|---|---|
| 7,586,398 | B2 * | 9/2009 | Huang et al. | 340/10.5 |
| 7,671,758 | B1 * | 3/2010 | Seidel et al. | 340/12.28 |
| 7,768,420 | B2 * | 8/2010 | Neogi et al. | 340/12.53 |
| 7,907,222 | B2 * | 3/2011 | Haughawout et al. | 348/734 |
| 8,339,304 | B2 * | 12/2012 | Yokozawa | 341/176 |
| 8,528,012 | B2 * | 9/2013 | Zeleznikar | 725/13 |
| 2002/0066034 | A1 * | 5/2002 | Schlossberg et al. | 713/201 |
| 2002/0101358 | A1 * | 8/2002 | De Bolster et al. | 340/825.72 |
| 2003/0003907 | A1 * | 1/2003 | Lai et al. | 455/425 |
| 2003/0003936 | A1 * | 1/2003 | Tighe | 455/517 |
| 2003/0189509 | A1 * | 10/2003 | Hayes et al. | 341/176 |
| 2004/0066377 | A1 * | 4/2004 | Ha | 345/169 |
| 2004/0070491 | A1 * | 4/2004 | Huang et al. | 340/10.5 |
| 2004/0091234 | A1 * | 5/2004 | Delorme et al. | 386/46 |
| 2004/0164874 | A1 * | 8/2004 | Tsai et al. | 340/825.72 |
| 2004/0208588 | A1 | 10/2004 | Colmenarez et al. | |
| 2004/0257259 | A1 * | 12/2004 | Jindal | 341/176 |
| 2005/0007495 | A1 * | 1/2005 | Aoyama et al. | 348/569 |
| 2005/0010821 | A1 * | 1/2005 | Cooper et al. | 713/201 |
| 2005/0285750 | A1 * | 12/2005 | Hayes et al. | 340/825.72 |
| 2006/0092037 | A1 * | 5/2006 | Neogi et al. | 340/825.22 |
| 2006/0103508 | A1 * | 5/2006 | Sato | 340/286.01 |
| 2006/0259864 | A1 * | 11/2006 | Klein et al. | 715/738 |
| 2006/0271437 | A1 * | 11/2006 | Maggio | 705/14 |
| 2007/0038342 | A1 * | 2/2007 | Grana et al. | 701/29 |
| 2007/0052547 | A1 * | 3/2007 | Haughawout et al. | 340/825.22 |
| 2007/0063860 | A1 * | 3/2007 | Escobosa et al. | 340/825.22 |
| 2007/0199062 | A1 * | 8/2007 | Cho | 726/12 |
| 2007/0222892 | A1 * | 9/2007 | Aoyama et al. | 348/569 |
| 2007/0236327 | A1 * | 10/2007 | Miyashita et al. | 340/3.71 |
| 2007/0290878 | A1 * | 12/2007 | Maggio | 340/825.24 |
| 2007/0296552 | A1 * | 12/2007 | Huang et al. | 340/10.5 |
| 2008/0070569 | A1 * | 3/2008 | Shelley et al. | 455/426.2 |
| 2009/0149139 | A1 * | 6/2009 | Harel et al. | 455/101 |
| 2013/0127731 | A1 * | 5/2013 | Song et al. | 345/169 |

FOREIGN PATENT DOCUMENTS

| | | | | |
|---|---|---|---|---|
| WO | WO0147130 | A1 | 6/2001 | |
| WO | WO0154292 | A1 | 7/2001 | |
| WO | WO0233496 | A1 | 4/2002 | |
| WO | WO2005043484 | A1 | 5/2005 | |
| WO | WO 2005043484 | A1 * | 5/2005 | G08C 19/28 |

* cited by examiner

PROGRAMMING OF A UNIVERSAL REMOTE CONTROL DEVICE

The invention relates to method and system for programming a universal remote control device and to a remote control device for use in such a method and system.

It is well known to provide consumer appliances with remote control devices for controlling their operation. However replacement of a remote control device when it has broken down can present problems. Typically, a universal remote control device must be bought in this case, which can be programmed to act as a remote control device for any of a plurality of appliances. As used herein a "universal remote control device" is a device that can be programmed to output commands from selectable ones of a plurality sets of commands, which apply to at least two different types of appliance. Programming of such a remote control device is cumbersome.

From PCT patent application WO 01/47130 it is known to program a universal remote control device by following menus displayed on a television set. Initially the user is asked to indicate the type of appliance that the universal remote control device must control. With a menu page the user is asked to indicate the initial letter of a brand name of the apparatus that must be controlled. After selecting of an initial letter another menu is used to select between a number of brands that start with the selected letter. After selection of the brand name a sub-code type for that brand name may be selected. Next a selection between a number of remote control command formats may be made, to try whether they work on the appliance.

Typically, this requires that the user knows type and brand number information and that the user experiments with the operation of the appliance. Even then the result is at most knowledge that some buttons of the remote control function properly and a hope that this will hold for all buttons.

Among others, it is an object to provide for an improved way of programming a universal remote control device.

According to one aspect a method according to claim 1 is provided. Herein layout properties of an existing remote control device are used to program a universal remote control device to implement a selected command set.

Figure 1A:
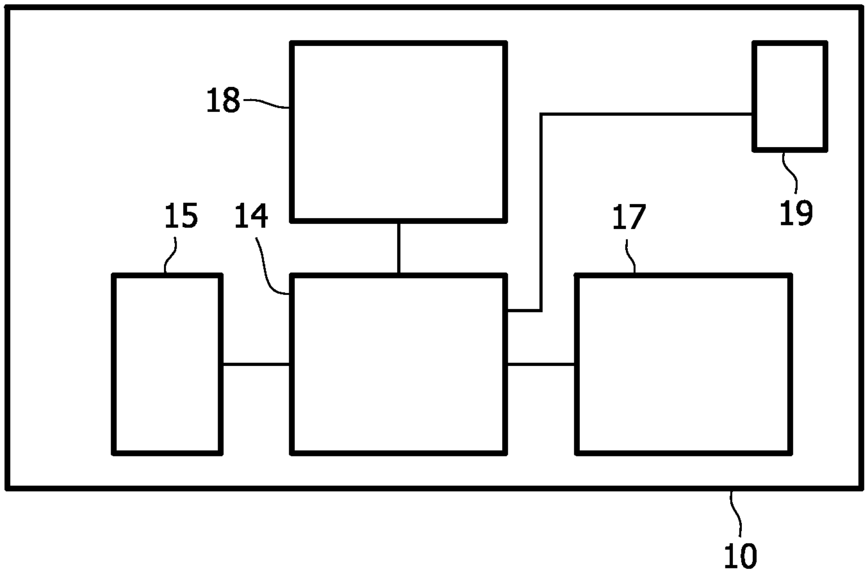
Figure 2:
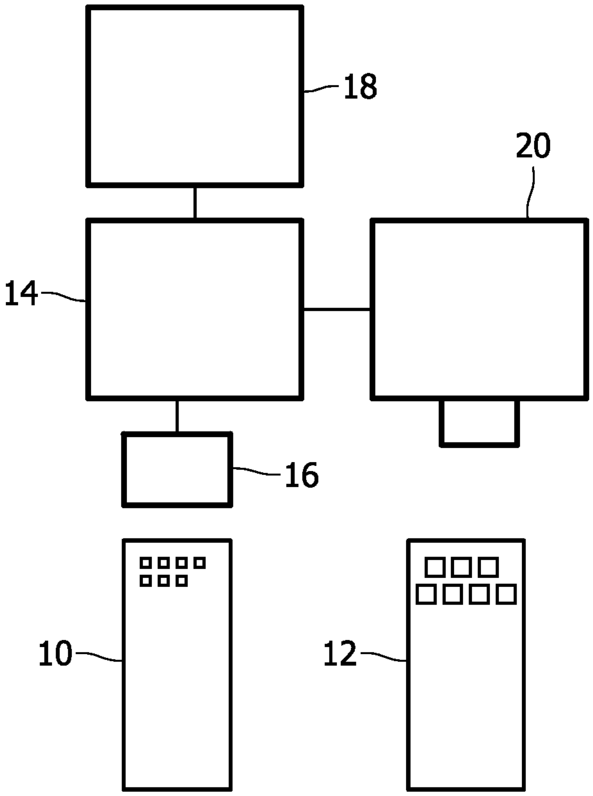
Figure 2A:
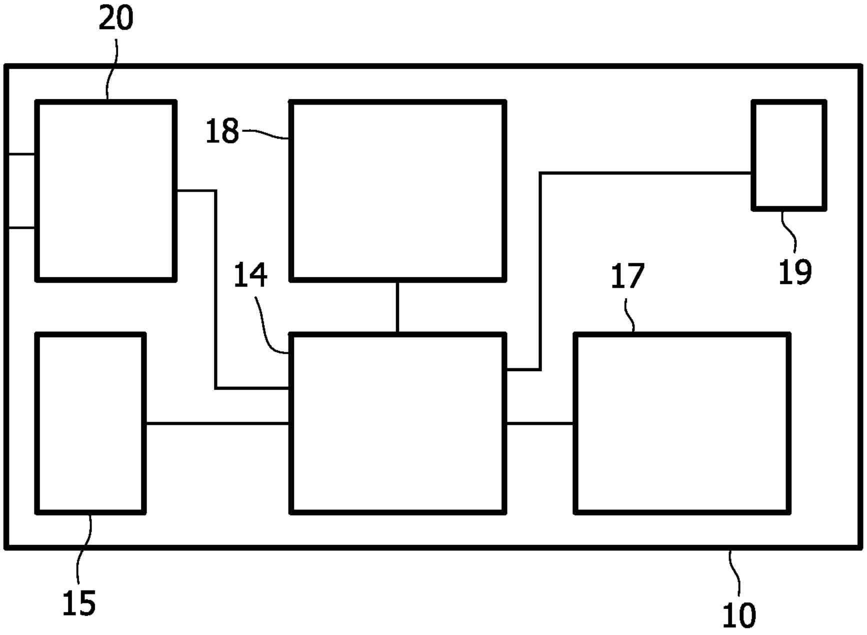

These and other objects and advantageous aspects will become apparent from a description of exemplary embodiments, using the following figures FIG. 1 shows a remote control device programming system FIG. 1*a* shows a remote control device FIG. 2 shows a remote control device programming system FIG. 2*a* shows a remote control device FIG. 1 shows a remote control device programming system. The system comprises a programmable universal remote control device 10, a programmed processing circuit 14, an input interface 15, a programming interface 16, a display screen 17 and a memory 18. Furthermore an existing remote control device 12 that is to be replaced by Input interface 15, programming interface 16, display screen 17 and memory 18 are coupled to a programmed processing circuit 14. Programming interface 16 is coupled to programmable universal remote control device 10, e.g. via an infrared connection (not shown).

Universal remote control device 10 is a remote control device for controlling an appliance like a set-top box, a television set, a video recorder, a hard disk recorder, a DVD player etc. (none shown).

In operation processing circuit 14 controls programming of universal remote control device 10. Processing circuit 14 outputs a series of queries on display screen 17 about the layout of existing remote control device 12 and receives responses to the queries on input interface 15. The queries may take the form of predetermined text loaded from memory 18 or display of images loaded from memory 18. The responses may be entered for example by pushing buttons on input interface 15 or using a mouse that is part of one embodiment of input interface 15. Preferably, a series of queries in organized as a decision tree stored is memory 18, processing circuit 14 selecting queries from successive branches dependent on the response to preceding queries.

When the responses have sufficiently identified an existing remote control device 12, processing circuit identifies a set of commands that corresponds to existing remote control device 12 and controls programming interface to program universal remote control device 10 to act as existing remote control device 12, by implement a code set that defines for each of a plurality of buttons on the universal remote control device 10 what signal the universal remote control device 10 must transmit in response to actuation of the button. In one embodiment processing circuit 14 merely causes a selection code to universal remote control device 10, universal remote control device 10 storing a plurality of code sets, from which one is selected by the selection code. In another embodiment processing circuit 14 programs a plurality of signals that must be sent when respective buttons of universal remote control device 10 are actuated. As a further alternative processing circuit 14 outputs the selection code to the user, who then enters the selection code manually into universal remote control device 10, instead of using programming interface 16.

In one embodiment the system may be located in a retail shop that sells universal remote control devices 10, so as to allow a salesman or a buyer to program universal remote control device 10 upon showing the existing (malfunctioning) remote control device 12 that must be replaced. In this embodiment processing circuit 14, input interface 15, display screen 17 and memory 18 may be part of a PC for example. In another embodiment part of the system may be located at a home of a user and part may be accessed via the Internet, the queries and the code set/selection code being retrieved via the Internet for example.

In yet another embodiment (as shown in FIG. 1*a*) the entire system is contained in universal remote control device 10, which has a remote command signal output interface 19 coupled to processing circuit 14. In this case the conventional buttons of the universal remote control device 10 may be used as input interface 15 and a control processor of the universal remote control device 10 may have an added program for querying about layout properties of the existing remote control device 12. In this case of course no separate remote programming interface 16 is needed, but processing circuit 14, run programming software that makes it serve as its own programming interface. Display screen 18 may be part of the universal remote control device 10, or the screen of a television set may be used.

Examples of queries output by processing circuit 14 may be textual queries like "what is the number of buttons of the old RC" (old RC standing for existing remote control device 12), "what is the number of rows of buttons of the old RC", "what is the number of buttons on the first row of the old RC", "does the old RC have a cursor" etc.

Preferably, part or all of the queries may be supported by the display of images of part or all of different existing remote control devices, in association with the response that should be entered when the existing remote control device 12 corresponds to an image to clarify the queries.

By way of example images for a query about the cursor shape may show only a cursor part of different existing remote control devices, The cursor part may show a disk for example, or four buttons, the buttons having a pointed or rounded arrow shape or the shape of a ring part etc.

By way of example images for query about the position of a "select (OK) button" may show select buttons at different positions relative to a cursor part of different existing remote control devices. The select button may be shown at the centre of the cursor show a disk for example, or to the side. Images for another query about the top rows of buttons may show only a top one to three rows of buttons of different existing remote control devices.

Each image may be associated with a response for example by displaying the image next to a key label of a key that should be pushed on input interface 15 when the image corresponds to the existing remote control device 12. Also different groups of images may displayed, each group in association with a respective response. In a further embodiment, images may be shown without textual query.

The images may be displayed under control of (optionally compressed) bitmap data of photographs of different existing remote control device 12. Alternatively, graphics definitions of images may be used in memory 18, processing circuit 14 generating images by graphics image generation techniques.

FIG. 2 shows an embodiment wherein a camera 20 is used to gather information about the layout of the existing remote control device 12. A web-cam coupled to a PC may be used for example. In the embodiment with a camera one or more (and preferably all) of the queries about the layout may be answered automatically by processing an image or images of the existing remote control device 12. Image processing techniques which are known per se may be used to match stored images of (parts of) of existing remote control devices with an of existing remote control device 12 that is presented to camera 20. Alternatively known image feature extraction techniques may be used to determine for example the shape, size, number and/or relative positions of the buttons on the existing remote control device 12, which information may be used to identify the type of existing remote control device 12 and used to select a command set for the universal remote control device 12.

FIG. 2*a* shows a further embodiment wherein camera 20 has been placed in the new remote control unit 10. A lens for camera 20 may be provided anywhere in the remote control unit with a view to the exterior of the remote control unit, e.g. with a view to the bottom from the remote control unit (away from the face where the buttons on the new remote control unit are provided. In this case the queries can be answered within the new remote control unit 10 after "showing" the existing remote control unit to the new remote control unit 10, e.g. by holding it above the existing remote control unit, or moving it from one part of the existing remote control unit to another instead of replying to different queries. Although the figure shows a specific embodiment with all components in new remote control unit 10, it should be appreciated that is only by way of example, for example it should be understood that alternatively use may be made of an external display device or another output device as described in the preceding, instead of the internal display screen.

In the embodiment of FIGS. 2 and 2*a* it is assumed that all queries can be answered using image processing, so that no display screen 17 or input interface 15 is needed. Alternatively, the system may also comprise display screen 17 or input interface 15 in addition to camera 20 and the system be configured to resort to user queries only if image processing fails to resolve a query with sufficient certainty or for queries that are not amenable to answers derived from image processing.

The invention claimed is:

1. A method of programming a universal remote control device for remotely controlling an appliance, the method comprising:

an output of a human user interface asking a human user a series of multiple questions regarding exterior layout properties of a second remote control device for remotely controlling the appliance, the second remote control device being different than the universal remote control device and different than the appliance;

an input of the human user interface receiving multiple responses from the human user to respective questions of the series of multiple questions regarding exterior layout properties of a second remote control device;

a processing circuit communicating with the input of the human user interface and receiving the multiple responses to respective questions of the series of multiple questions regarding layout properties of a second remote control device, and selecting subsequent questions of the series of multiple questions depending on a combination of previous responses of the multiple respective responses, and determining layout properties of the second remote control device depending on the combination of the previous responses;

the processor circuit determining the identity of the second remote control device depending on the determined layout properties of the second remote control device when sufficient exterior layout properties have been determined to identify the second remote control device;

the processor circuit terminating the series of multiple questions when sufficient layout properties have been determined to identify the second remote control device;

selection apparatus selecting a command set from a plurality of command sets for the universal remote control device dependent on the identification of the second remote control device for controlling the appliance; and a programming interface programming the universal remote control device to implement the selected command set which enables the universal remote control device for remotely controlling the appliance.

2. A method of claim 1, comprising the processing circuit selecting at least part of the series of multiple questions dependent on at least one of the respective exterior layout properties identified in response to a preceding one of the questions.

3. A method of claim 1, wherein the questions include a question about a shape of a cursor control of the second remote control device.

4. A method of claim 1, comprising:

storing information indicative of images representative of a plurality of different supported remote control devices;

displaying the images on a display screen;

the input of the human user interface controlled by the processor circuit receiving a selection of one of the displayed images.

5. A method of claim 4, wherein the universal remote control device comprises the display screen.

6. A method of claim 4, wherein the universal remote control device comprises a memory wherein the information indicative of the images is stored.

7. A method of claim 4, wherein the display screen is separate from the universal remote control device, the universal remote control device being used to input the selection.

8. A method of programming a universal remote control device for remotely controlling an appliance, the method comprising:

a camera capturing one or more images of the exterior of a second remote control device for remotely controlling the appliance, the second remote control device being different than the universal remote control device and different than the appliance;

a processing circuit applying automatic image recognition techniques to the images to determine exterior layout properties of the second remote control device;

the processor circuit determining the identity of the second remote control device depending on the determined exterior layout properties of the second remote control device when sufficient exterior layout properties have been determined to identify the second remote control device;

selection apparatus selecting a command set from a plurality of command sets for the universal remote control device dependent on the identification of the second remote control device for controlling the appliance; and a programming interface programming the universal remote control device to implement the selected command set which enables the universal remote control device for remotely controlling the appliance.

9. A system for programming a universal remote control device for remotely controlling an appliance, the system comprising:

an output of a human user interface configured to ask a human user a series of multiple questions regarding the exterior layout of a second remote control device for remotely controlling the appliance, the second remote control device being different than the universal remote control device and different than the appliance;

an input of the human user interface configured to receive multiple answers from a user to respective questions of the series of multiple questions pertaining to the exterior layout of the second remote control device for remotely controlling the appliance;

a processing circuit communicating with the input of the human user interface to receive the multiple answers to the respective questions in the series of multiple questions, and selecting subsequent questions of the series of multiple questions depending on a combination of multiple previous answers, and controlling the output of the human user interface to ask the subsequent questions in the series of multiple questions, and determining layout properties of the exterior layout of the second remote control device for remotely controlling the appliance depending on the combination of the multiple answers;

the processing circuit determining the identity of the second remote control device depending on the determined exterior layout properties of the second remote control device when a sufficient quantity of exterior layout properties have been determined to identify the second remote control device;

the processing circuit controlling the output of the human user interface to terminate asking the series of multiple questions when a sufficient quantity of exterior layout properties have been determined to identify the second remote control device;

selection apparatus configured to select a command set from a plurality of command sets for the universal remote control device dependent on the identification of the second remote control device for controlling the appliance; and a programming interface configured to program the universal remote control device to implement the selected command set which enables the universal remote control device for remotely controlling the appliance.

10. A system of claim 9, wherein the processing circuit is configured to select at least part of the questions of the series of multiple questions dependent on at least one of the exterior layout properties identified in response to at least one preceding question of the series of multiple questions.

11. A system of claim 9, wherein the questions include a question about a shape of a cursor control of the existing remote control device.

12. A system of claim 9 comprising:

a memory configured to store information indicative of images representative of a plurality of different supported remote control devices; and a display screen, the processing circuit being arranged to control the output of the human user interface to display the images on the display screen and the processing circuit being configured to control the input of the human user interface to receive a user-selection of at least one of the displayed images.

13. A system for programming a universal remote control device to remotely control an appliance, the system comprising:

a camera configured to capture one or more images of the exterior of a second remote control device for remotely controlling the appliance, the second remote control device being different than the universal remote control device and different than the appliance;

a processing circuit applying automatic image recognition techniques to the images to determine exterior layout properties of the second remote control device;

the processor circuit being configured to determine an identity of the second remote control device depending on the determined exterior layout properties of the second remote control device when sufficient exterior layout properties have been determined to identify the second remote control device;

selecting apparatus configured to select a command set for the universal remote control device dependent on the identity of the second remote control device; and a programming interface configured to program the universal remote control device to implement the selected command set, which enables the universal remote control device for remotely controlling the appliance.

14. A method of operating an integral universal remote control device for programming the universal remote control device for remotely controlling an appliance, the method comprising in the universal remote control device:

an output of a human user interface asking a human user a series of multiple questions regarding exterior layout properties of a second remote control device for remotely controlling the appliance, the second remote control device being different than the universal remote control device and different than the appliance, the human user interface being integral with the universal remote control device;

an input of a human user interface receiving multiple responses from the human user to respective questions of the series of multiple questions regarding exterior layout properties of a second remote control device;

a processing circuit integral with the universal remote control device communicating with the input of the human user interface receiving the multiple responses to respective questions of the series of multiple questions regarding layout properties of the second remote control device, and selecting subsequent questions depending on a combination of previous responses of the multiple respective responses, and determining layout properties of the second remote control device depending on the combination of the previous responses;

the processor circuit determining the identity of the second remote control device depending on the determined layout properties of the second remote control device when sufficient exterior layout properties have been determined to identify the second remote control device;

the processor circuit terminating the series of multiple questions when sufficient layout properties have been determined to identify the second remote control device;

selection apparatus integral with the universal remote control device selecting a command set from a plurality of command sets for the universal remote control device dependent on the identification of the second remote control device for controlling the appliance; and a programming interface integral with the universal remote control device automatically programming the universal remote control device to implement the selected command set which enables the universal remote control device to remotely control the appliance.

15. A method of operating an integral universal remote control device for programming the universal remote control device for remotely controlling an appliance, the method comprising in the universal remote control device:

a camera integral with the universal remote control device capturing one or more images of the exterior of a second remote control device for remotely controlling the appliance, the second remote control device being different than the universal remote control device and different than the appliance;

a processing circuit integral with the universal remote control device applying automatic image recognition techniques to the images to determine exterior layout properties of the second remote control device;

the processor circuit determining the identity of the second remote control device depending on the determined exterior layout properties of the second remote control device when sufficient exterior layout properties have been determined to identify the second remote control device;

selection apparatus integral with the universal remote control device selecting a command set from a plurality of command sets for the universal remote control device dependent on the identification of the second remote control device for controlling the appliance; and a programming interface integral with the universal remote control device automatically programming the universal remote control device to implement the selected command set which enables the universal remote control device to remotely control the appliance.

16. An integral universal remote control device for programming the universal remote control device for remotely controlling an appliance, the universal remote control device comprising:

an output of a human user interface to ask a human user a series of multiple questions regarding the exterior layout of a second remote control device for remotely controlling the appliance, the second remote control device being different than the universal remote control device and different than the appliance, the human user interface being integral with the universal remote control device;

an input of the human user interface configured for receiving multiple answers from a user to respective questions of the series of multiple questions pertaining to the exterior layout of the second remote control device for remotely controlling the appliance;

a processing circuit integral with the universal remote control device communicating with the input of the human user interface to receive the multiple answers to the respective questions in the series of multiple questions, and selecting subsequent questions of the series of multiple questions depending on a combination of multiple previous answers, and controlling the output of the human user interface to ask the subsequent questions in the series of multiple questions, and determining layout properties of the exterior layout of the second remote control device for remotely controlling the appliance depending on the combination of the multiple answers;

the processing circuit determining the identity of the second remote control device depending on the determined exterior layout properties of the second remote control device when a sufficient quantity of exterior layout properties have been determined to identify the second remote control device;

the processing circuit controlling the output of the human user interface to terminate asking of the series of multiple questions when a sufficient quantity of exterior layout properties have been determined to identify the second remote control device;

selection apparatus integral with the universal remote control device and configured to select a command set from a plurality of command sets for the universal remote control device dependent on the identification of the second remote control device; and a programming interface integral with the universal remote control device configured to program the universal remote control device to implement the selected command set which enables the universal remote control device for remotely controlling the appliance.

17. An integral universal remote control device for programming the universal remote control device for remotely controlling an appliance, the universal remote control device comprising:

a camera integral with the universal remote control device and configured to capture one or more images of the exterior of a second remote control device for remotely controlling the appliance, the second remote control device being different than the universal remote control device and different than the appliance;

a processing circuit integral with the universal remote control device and configured to apply automatic image recognition techniques to the images from the camera to determine exterior layout properties of the second remote control device;

the processor circuit being configured to determine the identity of the second remote control device depending on the determined exterior layout properties of the second remote control device when sufficient exterior layout properties have been determined to identify the second remote control device; and selection apparatus integral with the universal remote control device and configured to select a command set for the universal remote control device dependent on the identity of the second remote control device; and a programming interface integral with the universal remote control device and configured to program the universal remote control device to implement the selected command set, which enables the universal remote control device for remotely controlling the appliance.

18. The integral universal remote control device of claim 16 wherein the selection apparatus and the programming interface are part of the processor circuit.

19. The method of claim 14 comprising:

a camera integral with the universal remote control device capturing one or more images of the exterior of the second remote control device for remotely controlling the appliance; and the processing circuit applying automatic image recognition techniques to the images from the camera to determine exterior layout properties of the second remote control device.

20. The integral universal remote control device of claim 17 comprising:

a camera integral with the universal remote control device and configured to capture one or more images of the exterior of the second remote control device for remotely controlling the appliance; and the processing circuit being configured to apply automatic image recognition techniques to the images from the camera to determine exterior layout properties of the second remote control device.

21. A method of programming a universal remote control device for remotely controlling an appliance, the method comprising:

an input system for obtaining input regarding the exterior layout of a second remote control device, the second remote control device being different than the universal remote control device and different than the appliance;

a processing circuit for determining exterior layout properties of a second remote control device depending on the input regarding the exterior layout of a second remote control device;

the processor circuit determining the identity of the second remote control device depending on the determined exterior layout properties of the second remote control device when sufficient exterior layout properties have been determined to identify the second remote control device; and selection apparatus selecting a command set from a plurality of command sets for the universal remote control device dependent on the identification of the second remote control device for controlling the appliance; and a programming interface programming the universal remote control device to implement the selected command set which enables the universal remote control device to remotely control the appliance.

22. A universal remote control device for programming for remotely controlling an appliance, the universal remote control device comprising:

an input system for obtaining input regarding the exterior layout of a second remote control device, the second remote control device being different than the universal remote control device and different than the appliance;

a processing circuit for determining exterior layout properties of the second remote control device depending on the input regarding the exterior layout of a second remote control device;

the processor circuit being configured to determine the identity of the second remote control device depending on the determined exterior layout properties of the second remote control device when sufficient exterior layout properties have been determined to identify the second remote control device; and selection apparatus configured to select a command set for the universal remote control device dependent on the identity of the second remote control device; and a programming interface configured to program the universal remote control device to implement the selected command set, which enables the universal remote control device for remotely controlling the appliance.

* * * * *